(12) United States Patent
Campbell

(10) Patent No.: US 12,545,308 B2
(45) Date of Patent: Feb. 10, 2026

(54) DOLLY-SEAT CONVERTIBLE HAND CART TO STOOL

(71) Applicant: Gregory Martin Campbell, Chula Vista, CA (US)

(72) Inventor: Gregory Martin Campbell, Chula Vista, CA (US)

( * ) Notice: Subject to any disclaimer, the term of this patent is extended or adjusted under 35 U.S.C. 154(b) by 411 days.

(21) Appl. No.: 18/345,620

(22) Filed: Jun. 30, 2023

(65) Prior Publication Data
US 2025/0002063 A1    Jan. 2, 2025

(51) Int. Cl.
*B62B 1/12* (2006.01)
*A47C 13/00* (2006.01)

(52) U.S. Cl.
CPC ............... *B62B 1/12* (2013.01); *A47C 13/00* (2013.01); *B62B 2206/006* (2013.01)

(58) Field of Classification Search
CPC ...... B62B 1/12; B62B 2206/006; A47C 13/00
See application file for complete search history.

(56) References Cited

U.S. PATENT DOCUMENTS

| | | | | |
|---|---|---|---|---|
| 4,846,486 A | * | 7/1989 | Hobson | A47C 4/52 D34/25 |
| 6,880,835 B2 | * | 4/2005 | Tornabene | B62B 1/26 182/20 |
| 7,487,859 B2 | * | 2/2009 | Wang | E06C 1/20 182/20 |
| 10,118,631 B2 | * | 11/2018 | Gunther | B62B 1/12 |
| 10,506,803 B1 | * | 12/2019 | Wu | A47C 7/006 |
| 11,548,137 B2 | * | 1/2023 | Van Bergen | B25H 1/16 |

* cited by examiner

*Primary Examiner* — Bryan A Evans

(57) ABSTRACT

The purpose of this invention is to combine a four-legged type of stool with a hand cart. This is useful for, but not limited to, performers, for example, who have to haul in amplifiers and road cases etc. to a venue, then perform sitting down. With this invention the integral combination of hand cart and stool allows the user to load in equipment, then convert the hand cart to a stool on which to sit. Then convert it back to a hand cart to load equipment back out. This is accomplished by the new integration of additional vertical structures and connectors to the hand cart design, which upon expansion and inversion, become the front legs for the stool. When inverted, the bottom plate structure of the hand cart becomes the seat.

4 Claims, 8 Drawing Sheets

DOLLY-SEAT CONVERTIBLE HAND CART TO STOOL

BACKGROUND OF THE INVENTION

The field of endeavor of this present invention includes products that aid in the transportation of items and the products needed for one to be seated.

This present invention solves the problem of requiring two separate items needed in the transportation of items and for one to be seated. This is the case for, but not limited to, many musicians/performers who, after loading in their amplifiers and other gear, wish then to be seated while performing.

This present invention elegantly combines the two items into one convenient utility, thus solving the issue of having two separate items taking up valuable space in the vehicle, and valuable time to load and unload.

RELATED ART a. A variety of combination dollies and chairs are available that are useful for many purposes. For example, U.S. Pat. No. 4,824,167 to King references a soft seat folding chair that functions as a luggage carrier when unfolded. Also, U.S. Pat. No. 5,669,659 to Dittmer references a conventional folding chair that functions as a dolly when collapsed. However, neither of these disclose, teach or suggest a conventional looking hand cart when in the dolly configuration, nor do they resemble a conventional four-legged stool when unfolded, and neither involve inverting the unit to achieve either configuration. In addition, there is no retrofitting or adapting of current market products. While utilizing the universal designs of hand carts and stools, this present invention is altogether new and unique.

INT. CL
  a. A47C 13/00; A47C 4/04; A47C 4/10; A47C 4/18; A47C 4/20; B62B 1/00; B62B 1/12; B62B 1/20; B62B3/02
US CL
  a. A47C 13/00; A47C 4/04; A47C 4/10; A47C 4/18; A47C 4/20; B62B 1/00; B62B 1/12; B62B 1/20; B62B3/02

Field of Classification Search a. A47C 13/00; A47C 4/04; A47C 4/10; A47C 4/18; A47C 4/20; B62B 1/00; B62B 1/12; B62B 1/20; B62B3/02

BRIEF SUMMARY OF THE INVENTION

This present invention consists of a modified conventional two wheeled hand cart design (approximately 36-40 inches tall with handles and a single bottom plate as shown in the drawings) and can be used as such, but is constructed such that by expanding the modified structure and inverting it, the unit becomes a conventional padded stool with footrest. Collapsing the structure and returning it to an upright position, it reverts to the hand cart.

This elegantly solves the problem of needing two separate items for anyone having to transport heavier items from one location to another, then desiring a place to be seated while performing their duties.

DETAILED DESCRIPTION OF THE INVENTION

Figure 6:
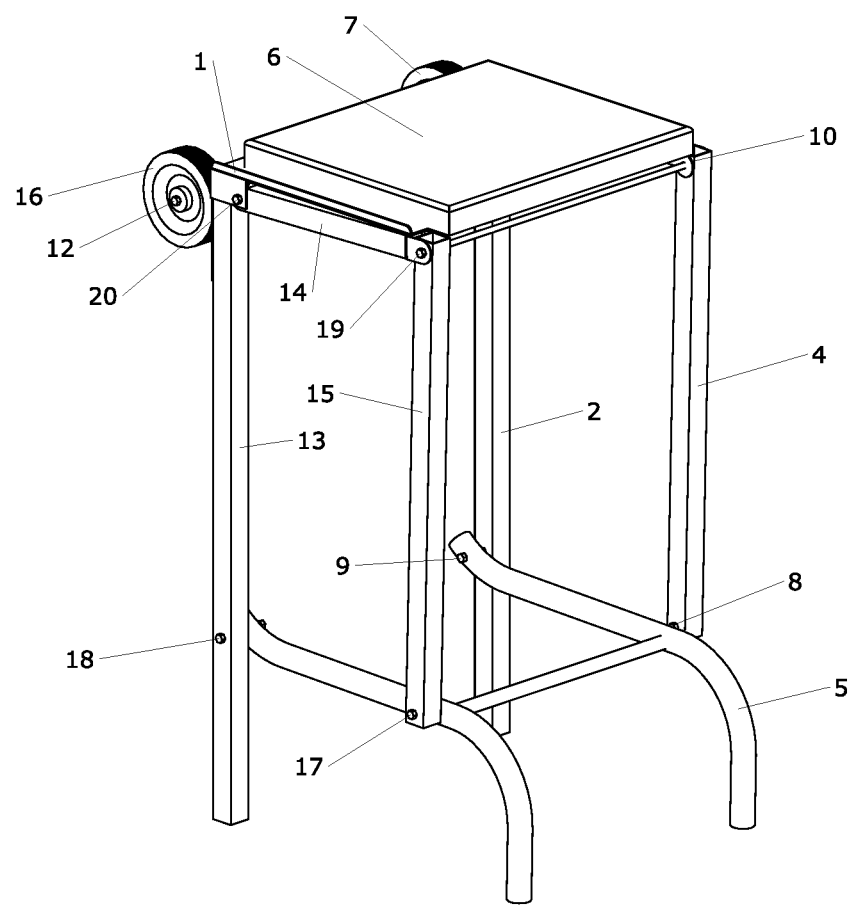
FIG. 6 is an isometric view of the unit in the stool configuration now inverted.

This present invention integrates a conventional hand cart with a conventional four-legged stool. As shown in FIG. 6, this is accomplished by utilizing the two static vertical standards 2 and 13 of a conventional hand cart design as the rear legs for the stool, and two auxiliary vertical standards 4 and 15 in combination with two shorter connecting arms (3 obscured in this view) and 14, and the handle/footrest assembly 5 to become the front legs of the stool when inverted.

The static vertical standards 2 and 13 of the hand cart do not include the handle of the hand cart. They are truncated at the height of what will become the stool, as to function as the rear legs when the unit is inverted.

Figure 1:
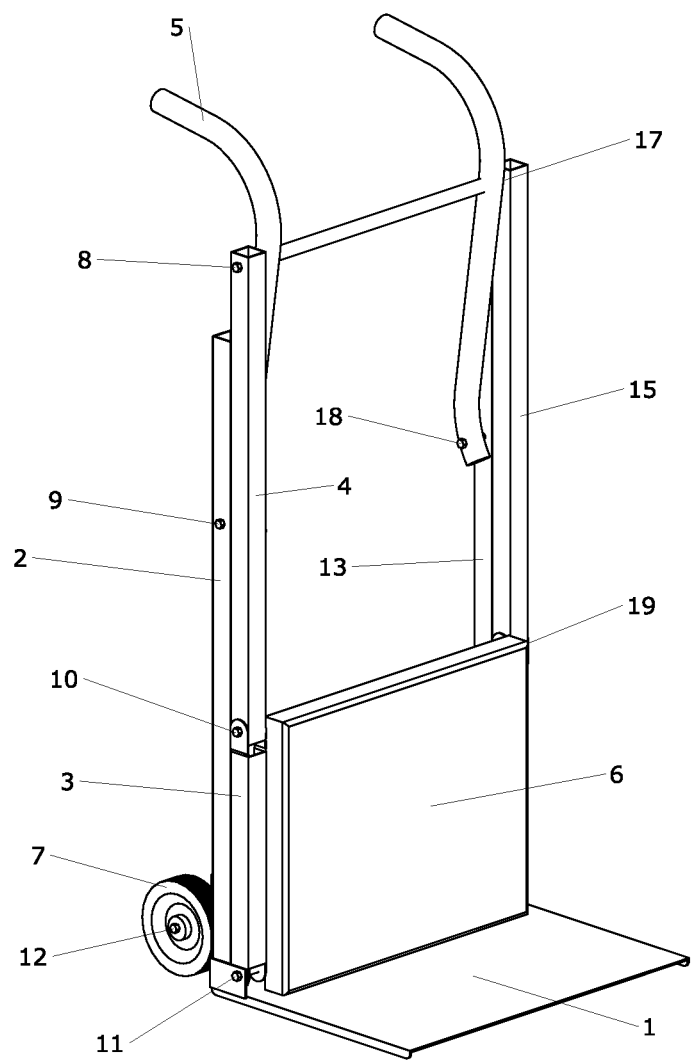
FIG. 1 shows an isometric view of the present invention in the hand cart configuration.

The handles for the hand cart are provided by the handle/footrest assembly 5 when the unit is in the hand cart configuration as shown in FIG. 1.

Figure 2:
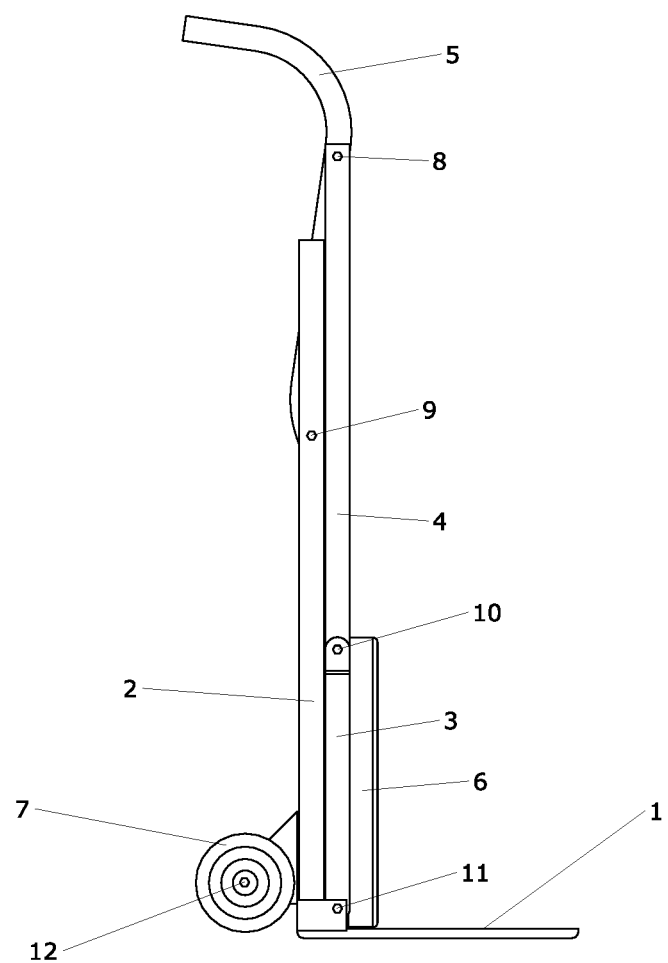
FIG. 2 shows a view from the left side of the present invention in the hand cart configuration.
Figure 7:
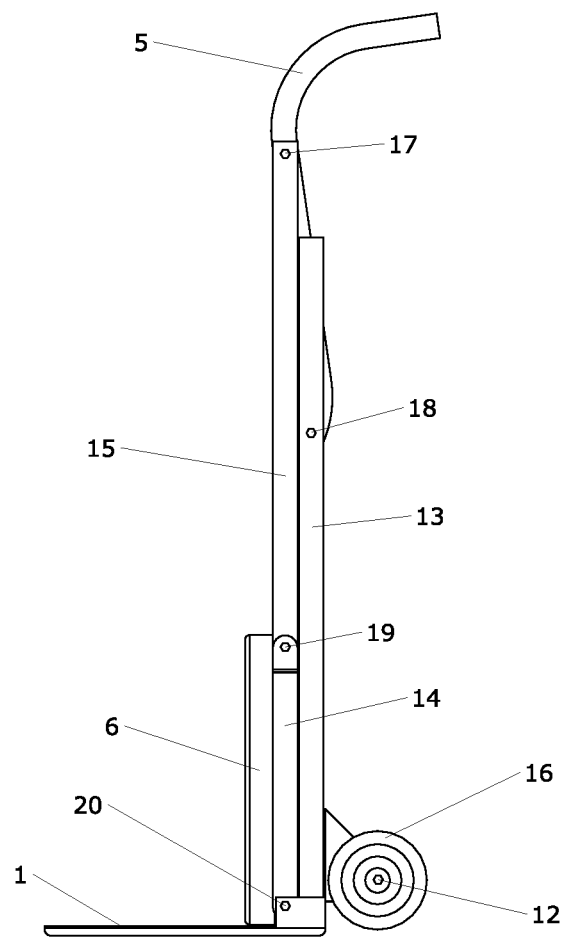
FIG. 7 shows a view from the right side as to identify items obscured in other views.
Figure 8:
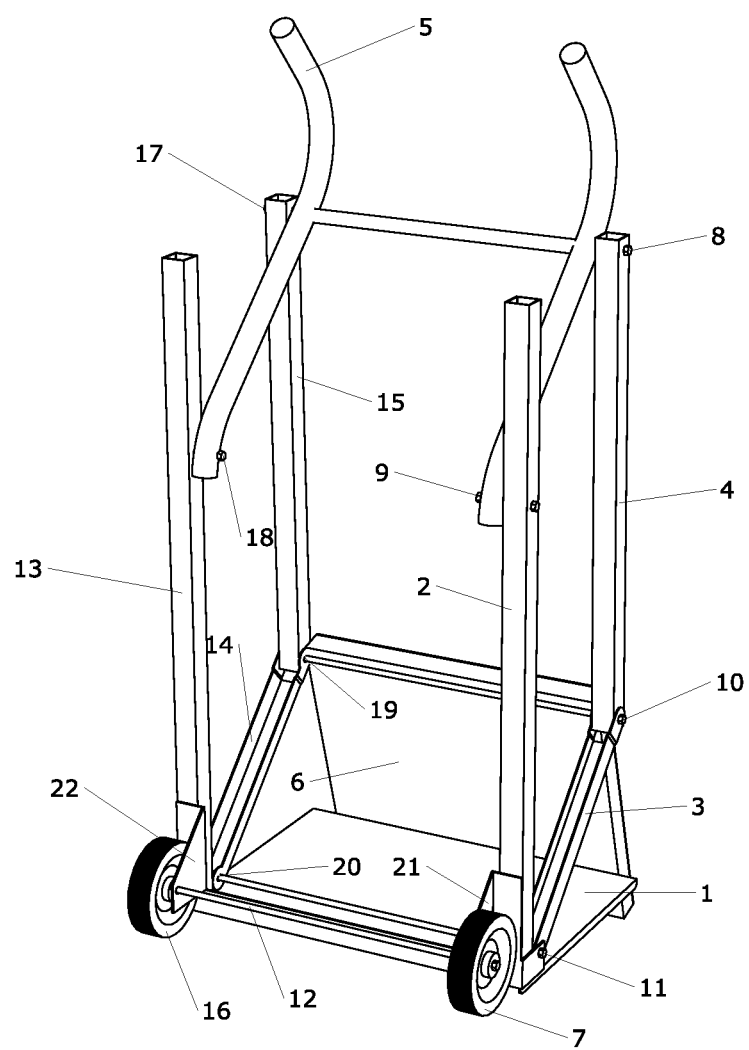
FIG. 8 shows a view from the rear to show attachment points for the axle and wheels.

The static vertical standards 2 and 13 of the hand cart are permanently attached to the bottom plate structure 1. At that point, there are additional shorter connecting arms 3 and 14 on either side, roughly as long as the depth of the bottom plate structure 1, connected by pivot joints 11 and 20 as shown in FIG. 2, FIG. 7 and FIG. 8.
  a. The bottom plate structure 1 of the hand cart is formed in one piece such that it provides for the shorter connecting arm's pivot joints 11 and 20 and wings for axle mounts 21 and 22 for the wheels 7 and 16 as shown in FIG. 8, and when inverted, becomes the base of the seat for the stool as shown in FIG. 6.

The other side of the shorter connecting arms 3 and 14 are attached to the auxiliary vertical standards 4 and 15 by pivot joints 10 and 19. Both run along-side the static vertical standards 2 and 13 in the hand cart configuration as shown in FIG. 2 and FIG. 7.

A padded seat assembly 6 is also attached at pivot joints 10 and 19 as shown in FIG. 6 and FIG. 8.

Figure 4:
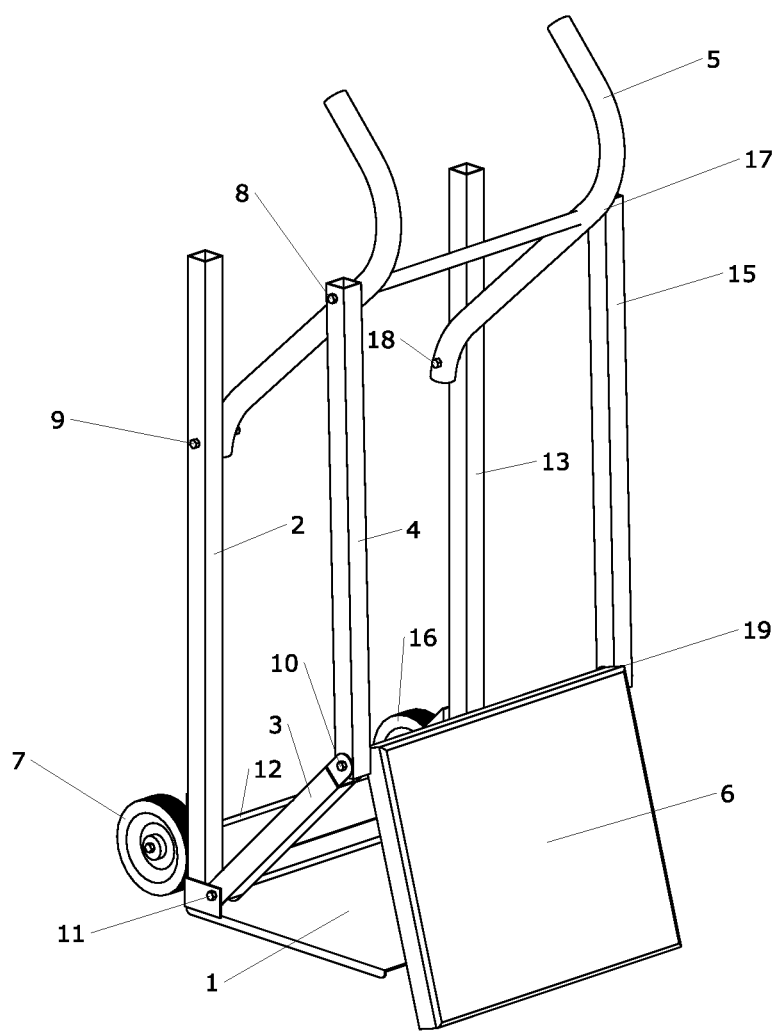
FIG. 4 shows an isometric view of the present invention partially folded out

The top of the two auxiliary vertical standards 4 and 15 and the static standards 2 and 13 are connected by the handle/footrest assembly 5. at pivot points 8, 17, 9 and 18 respectively as shown in FIG. 4 and FIG. 8. The handle/footrest assembly 5 is fashioned such that in the hand cart configuration, it functions as the handles for the hand cart, and in the stool configuration, it functions as completing the front legs and providing a foot rest.

Figure 3:
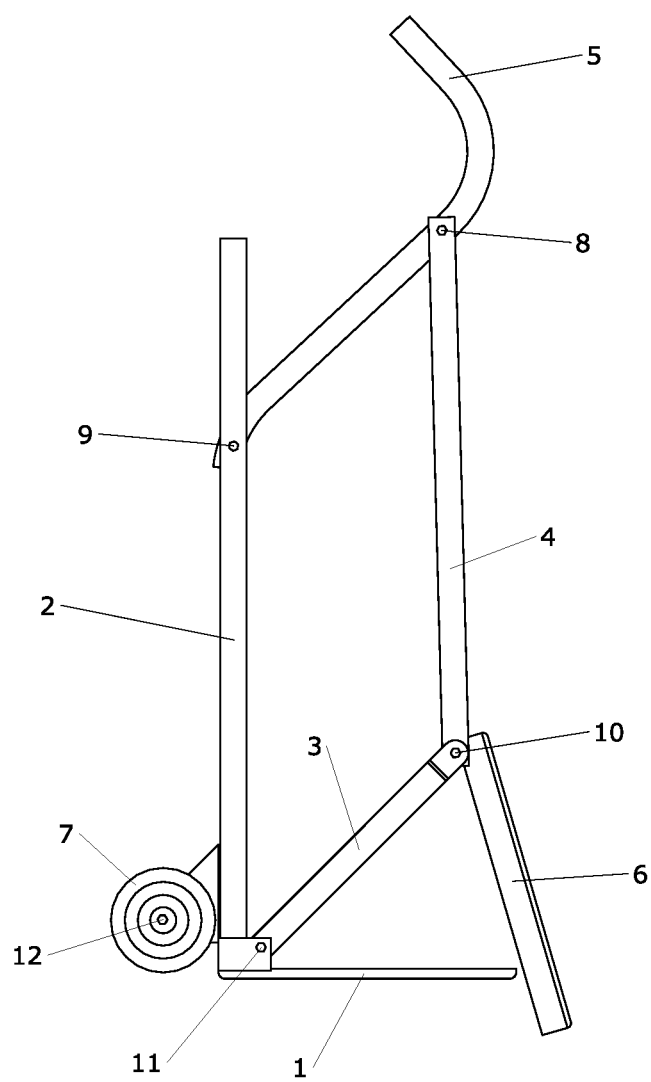
FIG. 3 shows a view from the left side of the present invention partially folded out.

When viewed from the side as shown in FIG. 3, the static vertical standards 2 and (13 obscured in this view), shorter connecting arms 3 and (14 obscured in this view), auxiliary standards 4 and (15 obscured in this view), and handle/ footrest assembly 5 form a pseudo parallelogram when partially folded out, which allows the structure to fold out completely to a rectangular shape by way of the said related pivot points.

When folded flat, as viewed from the side as shown in FIG. 2 and FIG. 7, the auxiliary vertical standards 4 and 15, and shorter connecting arms 3 and 14 meet the static vertical standards 2 and 13, as to form a single vertical upright for the hand cart configuration, with the bottom plate structure 1 and wheels 7 and 16 below, and handle/footrest assembly 5 at the top.

Figure 5:
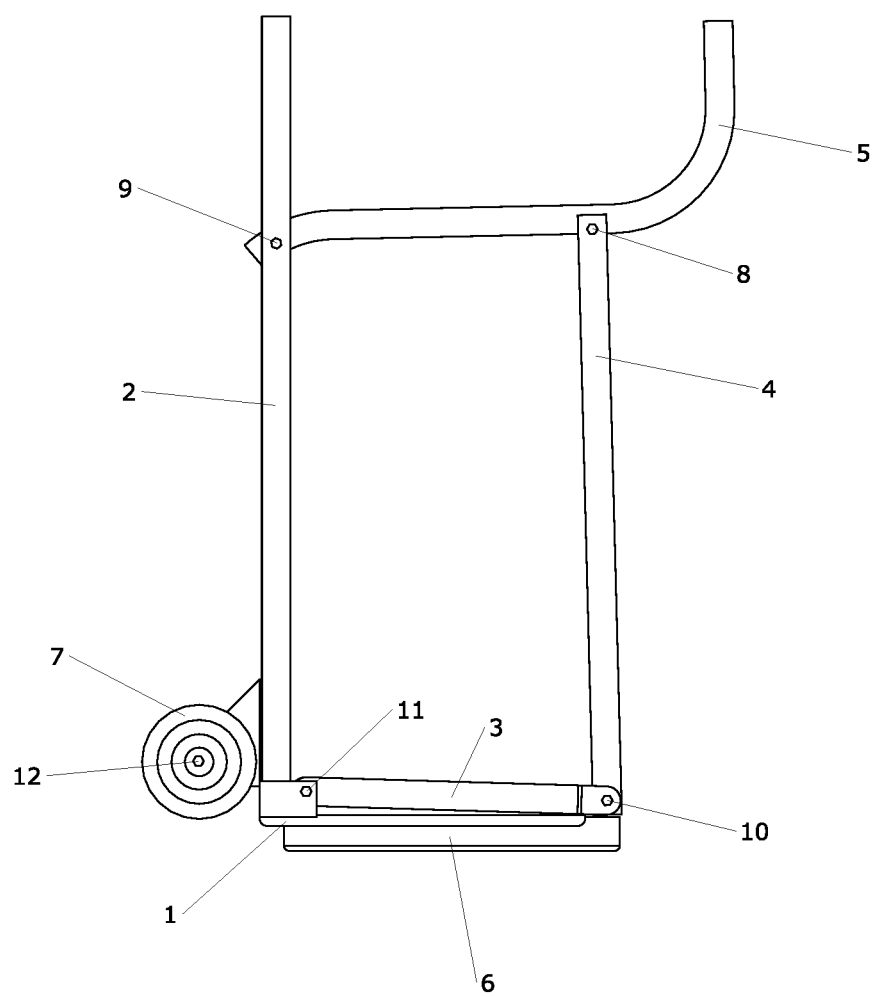
FIG. 5 shows a view from the left side showing the present invention completely folded out with the seat assembly folded under the bottom plate structure. This is the stool configuration not yet inverted.

When unfolded to the rectangular shape, as viewed from the side as shown in FIG. 5, the handle/footrest assembly 5 along with the auxiliary vertical standards 4 and (15 obscured in this view) become the completed front legs, the static vertical standards 2 and (13 obscured in this view) become the rear legs, and the padded seat assembly 6 folds over the bottom plate structure 1 to become the seat.

Folding the seat assembly 6 over the bottom plate structure 1 as referenced in [26] traps the bottom plate structure 1 along the pivot joints between 10 and 19 such that it prevents the unit from spontaneously unfolding.

The unit is then inverted as shown in FIG. 6, such that the bottom plate structure 1, now functioning as the seat rest, along with the seat assembly 6, are at the top. The auxiliary vertical standards 4 and 15 and handle/footrest assembly 5 together function as the front legs of the stool and the static vertical standards 2 and 13 function as the rear legs of the stool.

Folding the unit back to a flat configuration and inverting it returns it to a hand cart.

The bottom plate is constructed from a single piece of sheet metal of sufficient thickness to provide strength for the hand cart functionality. Vertical and auxiliary standards may be made of square tubing. Shorter connecting arms are formed from sheet metal of sufficient thickness as to support the weight of the user when the unit is in the seat configuration. The handle/footrest assembly is fashioned from round tubular stock of sufficient thickness as to support the weight of the user when the unit is in the seat configuration. The seat assembly is of a covered foam pad and substrate, with a bracket attached to the bottom for pivot joints.

Pivot joints 8 and 17 are formed by a single rod through the said pivot joints, joining the left side to the right side.

Pivot joints 10 and 19 are formed by a single rod through the said pivot joints, joining the left side to the right side.

Pivot joints 11 and 20 are formed by a single rod through the said pivot joints, joining the left side to the right side.

The axle 12 for wheels 7 and 16 is a single rod through the hubs of the wheels 7 and 16 and wings 21 and 22 of the bottom plate structure 1 as shown in FIG. 8

The invention claimed is:

1. A conventional hand cart that functions as such, constructed with the addition of certain structures as to create a collapsible three-dimensional pseudo parallelogram, or pseudo parallelepiped, type device attached to the conventional hand cart such that when unfolded becomes a three-dimensional rectangular shape, or rectangular parallelepiped, and when inverted, functions as a conventional seat or stool by way of: two auxiliary vertical structures added to a conventional hand cart design, one on the left side and one on the right side, such that in the hand cart configuration, lie flat against the left and right permanent vertical standards of a conventional hand cart; and are connected to the hand cart by two shorter connecting arms that are each connected to one end of each auxiliary vertical structure, along with a padded seat, by way of pivot joints; and the other end of the shorter connecting arms are connected to the hand cart by way of left and right pivot joints at the point where the permanent vertical structures are attached to the bottom plate structure or tongue of the hand cart; and the addition of a single structure that functions as the left and right handles in the hand cart configuration, and footrest/leg-extensions in the stool configuration; connected to each of the auxiliary vertical structures on the left and right side by way of pivot joints, and to the permanent vertical structures on the left and right side by way of pivot joints such that the entire apparatus is allowed unfold to what resembles a three dimensional rectangle, or rectangular parallelepiped, with the addition of the footrest/leg extensions; and when the entire structure is inverted functions as a seat or stool.

2. The conventional hand cart of claim 1, wherein the single structure that comprises the left and right handle in the hand cart configuration and footrest/leg-extension in the stool configuration is a single piece constructed of two "S" shaped tubular pieces that are permanently connected to each other by a tubular cross piece, through which passes a solid rod that functions as a left and right pivot joint.

3. The conventional hand cart of claim 1, wherein the bottom plate structure or tongue incorporates the tongue of the hand cart, pivot joints for the shorter connecting arms, wings for the axle to attach, lateral and vertical strength for the permanent vertical standards, and provides an area on which the padded seat rests when the padded seat is folded over the bottom plate structure.

4. The conventional hand cart of claim 1, that the padded seat's pivot joint traps the bottom plate structure when folded over, thus keeping the unit from spontaneously unfolding.

* * * * *